United States Patent
Krieger

(10) Patent No.: US 10,623,318 B2
(45) Date of Patent: Apr. 14, 2020

(54) PROBABILISTIC MESSAGE FILTERING AND GROUPING

(71) Applicant: Google LLC, Mountain View, CA (US)

(72) Inventor: Ken Krieger, Jackson, WY (US)

(73) Assignee: Google LLC, Mountain View, CA (US)

(*) Notice: Subject to any disclaimer, the term of this patent is extended or adjusted under 35 U.S.C. 154(b) by 107 days.

(21) Appl. No.: 15/911,717

(22) Filed: Mar. 5, 2018

(65) Prior Publication Data
US 2018/0198714 A1    Jul. 12, 2018

Related U.S. Application Data

(63) Continuation of application No. 14/559,388, filed on Dec. 3, 2014, now Pat. No. 9,912,594.

(60) Provisional application No. 62/010,053, filed on Jun. 10, 2014, provisional application No. 62/010,012, filed on Jun. 10, 2014.

(51) Int. Cl.
| | |
|---|---|
| *H04L 12/801* | (2013.01) |
| *H04W 8/00* | (2009.01) |
| *H04W 12/02* | (2009.01) |
| *H04W 4/80* | (2018.01) |

(52) U.S. Cl.
CPC ............. *H04L 47/12* (2013.01); *H04L 47/19* (2013.01); *H04W 4/80* (2018.02); *H04W 8/005* (2013.01); *H04W 12/02* (2013.01)

(58) Field of Classification Search
CPC ........ H04L 65/00–658; H04L 41/00–41/5096; H04L 47/00–47/19; H04W 8/00–8/005; H04W 12/00–12/02; H04W 4/70–4/80
See application file for complete search history.

(56) References Cited

U.S. PATENT DOCUMENTS

| | | |
|---|---|---|
| 2005/0169219 A1 | 8/2005 | Serpa et al. |
| 2009/0131079 A1 | 5/2009 | Sekhar |
| 2011/0227790 A1* | 9/2011 | Li .................... G01S 1/042 342/386 |

(Continued)

FOREIGN PATENT DOCUMENTS

| | | |
|---|---|---|
| EP | 2 015 485 | 1/2009 |
| EP | 2 166 799 | 3/2010 |

(Continued)

OTHER PUBLICATIONS

International Search Report for PCT/US2015/030725 dated Aug. 10, 2015—5 pages.

*Primary Examiner* — Clayton R Williams
(74) *Attorney, Agent, or Firm* — Dority & Manning, PA

(57) ABSTRACT

Systems and methods for generating and using probabilistic filters are provided. One example method includes obtaining a plurality of beacon identifiers respectively associated with a plurality of beacon devices. The operations include determining a plurality of filter shards for each beacon identifier by applying a plurality of hash functions to each beacon identifier. The operations include providing the plurality of filter shards for each beacon identifier for local storage in a probabilistic filter at an observing entity, such that the observing entity can query the probabilistic filter to receive an indication of whether a received identifier is a member of a set that includes the plurality of beacon identifiers. One example system includes a plurality of beacon devices, at least one observing entity, and at least one verifying entity.

19 Claims, 2 Drawing Sheets

(56) References Cited

U.S. PATENT DOCUMENTS

| | | |
|---|---|---|
| 2012/0257626 A1 | 10/2012 | McGhee et al. |
| 2013/0031367 A1 | 1/2013 | Mao et al. |
| 2013/0204415 A1 | 8/2013 | Fregley et al. |
| 2014/0172309 A1 | 6/2014 | Guthrie |
| 2014/0282620 A1 | 9/2014 | Nuovo et al. |
| 2015/0227969 A1* | 8/2015 | Hanly ............... G06Q 30/0252 705/14.5 |
| 2015/0254704 A1 | 9/2015 | Kothe et al. |

FOREIGN PATENT DOCUMENTS

| | | |
|---|---|---|
| GB | 2 488 847 | 9/2012 |
| WO | WO 2009/158643 | 12/2009 |

* cited by examiner

PROBABILISTIC MESSAGE FILTERING AND GROUPING

PRIORITY CLAIM

The present disclosure is a continuation of U.S. application Ser. No. 14/559,388 having a filing date of Dec. 3, 2014, which is based on and claims priority to U.S. Provisional Application 62/010,012 having a filing date of Jun. 10, 2014 and U.S. Provisional Application 62/010,053 having a filing date of Jun. 10, 2014. Applicants claim priority to and benefit of all such applications and incorporate all such applications herein by reference.

FIELD

The present disclosure relates generally to probabilistic message filtering and grouping. In particular, the present disclosure is directed to the generation and use of probabilistic filters in the context of a system that features a plurality of beacon devices, at least one observing entity, and at least one verifying entity.

BACKGROUND

Certain systems exist in which a broadcasting device can provide (e.g. broadcasts using a short range wireless communication technology) information that identifies the first device. For example, the information can be a publicly available identifier or an obscured (e.g. encrypted) identifier. An observing entity can receive the information and can communicate with a central verifying entity to learn the identity of the broadcasting device and receive additional information (e.g. semantic information) about the broadcasting device that is stored at the verifying entity. A system configured as described above can be used for various purposes, including communication, information provisioning, asset tracking, retail identification, localization, safety, etc.

However, in the instance in which such systems include a significantly large number of broadcasting devices, the above noted configuration can have several drawbacks. As an example, as the number of broadcasting nodes increase, the airwaves become increasingly crowded with broadcast signals, updates, measurements, or messages. Some of these signals are likely useful and meaningful to a given observing entity (e.g. a smartphone of a user). However, a vast majority of these signals are simply noise and are irrelevant to the observing entity.

Therefore, it is highly inefficient for the observing entity to communicate with the central verifying entity at each instance in which a signal is received, as the vast majority of these communications will result in information that is not useful to the observing entity. In particular, such large number of unnecessary communications can consume vast amounts of communication bandwidth, overload shared communication channels, and can represent a direct cost to an observing entity that is charged by volume of data traffic. In addition, the large number of unnecessary communications can also represent an energy consumption problem, for example, by draining a battery of the observing entity.

SUMMARY

Aspects and advantages of the present disclosure will be set forth in part in the following description, or may be apparent from the description, or may be learned through practice of embodiments of the present disclosure.

One example aspect of the present disclosure is directed to a computer-implemented method for using probabilistic filters. The method includes receiving, by one or more computing devices, a plurality of filter shards from a verifying entity. The plurality of filter shards correspond to a set of beacon identifiers respectively associated with a plurality of beacon devices. The method includes storing, by the one or more computing devices, the plurality of filter shards in a probabilistic filter. The method includes receiving, by the one or more computing devices, a first beacon identifier from a first beacon device. The method includes applying, by the one or more computing devices, a plurality of hash functions to the first beacon identifier to obtain a plurality of hashed identifiers. The method includes querying, by the one or more computing devices, the probabilistic filter using the plurality of hashed identifiers to receive an indication of whether the first beacon identifier is a member of the set of beacon identifiers.

One example aspect of the present disclosure is directed to a computer-implemented method for using probabilistic filters. The method includes receiving, by one or more computing devices, a plurality of filter shards from a verifying entity. The plurality of filter shards correspond to a plurality of beacon identifiers respectively associated with a plurality of beacon devices. The plurality of beacon devices satisfy one or more criteria respectively defining one or more beacon device attributes. The method includes storing, by the one or more computing devices, the plurality of filter shards in a probabilistic filter. The method includes receiving, by the one or more computing devices, a first beacon identifier from a first beacon device. The method includes applying, by the one or more computing devices, a plurality of hash functions to the first beacon identifier to obtain a plurality of hashed identifiers. The method includes querying, by the one or more computing devices, the probabilistic filter using the plurality of hashed identifiers to receive an indication of whether the first beacon identifier is a member of a set of beacon identifiers that includes the plurality of beacon identifiers.

Another example aspect of the present disclosure is directed to one or more non-transitory computer-readable media storing instructions that, when executed by one or more processors, cause the one or more processors to perform operations. The operations include obtaining a plurality of beacon identifiers respectively associated with a plurality of beacon devices. The operations include determining a plurality of filter shards for each beacon identifier by applying a plurality of hash functions to each beacon identifier. The operations include providing the plurality of filter shards for each beacon identifier for local storage in a probabilistic filter at an observing entity, such that the observing entity can query the probabilistic filter to receive an indication of whether a received identifier is a member of a set that includes the plurality of beacon identifiers.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
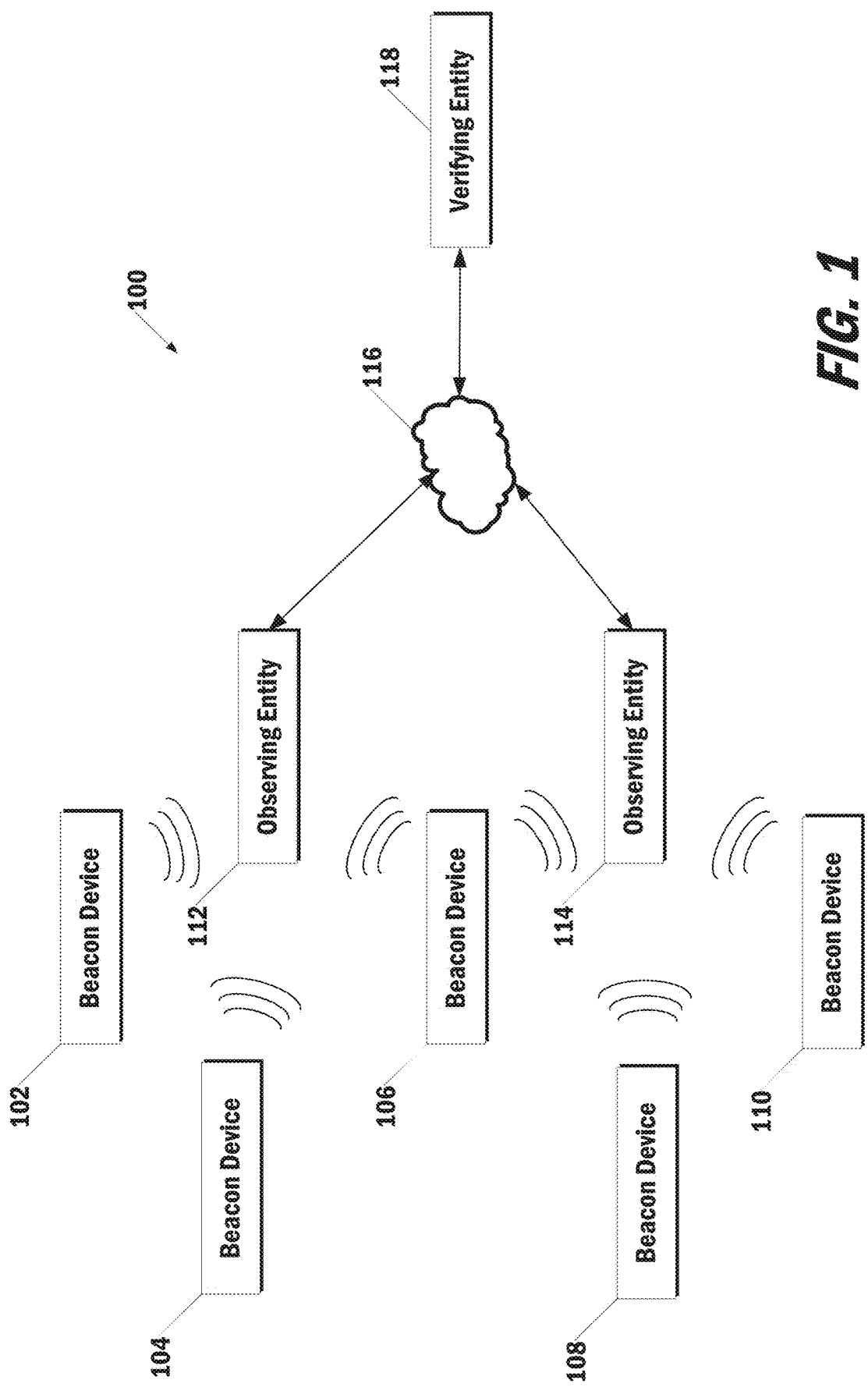
FIG. 1 depicts an example system according to an example embodiment of the present disclosure.

Generally, the present disclosure is directed to probabilistic filter techniques for signaling and messaging and message filtering and grouping in the context of a system that features a plurality of beacon devices, at least one observing entity, and at least one verifying entity. In particular, one or more probabilistic filters (e.g. Bloom filters) can be generated by the verifying entity and provided to the observing entity. In certain implementations of the present disclosure, one or more criteria-specific probabilistic filters can be generated by the verifying entity and provided to the observing entity. Each probabilistic filter or criteria-specific probabilistic filter can include data corresponding to a defined set of beacon identifiers associated with a set of beacon devices. In particular, the set of beacon devices can be beacon devices that satisfy one or more criteria. The observing entity can store the received probabilistic filters locally and can use the probabilistic filters to determine an appropriate action upon receiving a beacon identifier from a beacon device, thereby allowing the observing entity to locally sort or group received messages according to the various topics or other criteria.

More particularly, the observing entity can query one or more of its local probabilistic filters to identify one or more sets of beacon identifiers to which the received beacon identifier belongs (e.g. is a member). By using the probabilistic filters or criteria-specific probabilistic filters to identify (or fail to identify) one or more sets of beacon identifiers to which the received beacon identifier belongs, the observing entity can determine one or more appropriate actions to take in response to receiving the beacon identifier. In particular, the actions taken by the observing entity can depend upon the identified set membership of the received beacon identifier and can include, for example, routing the received beacon identifier to a particular application, disregarding the received beacon identifier, communicating with the verifying entity to obtain additional information concerning the beacon device with which the received beacon identifier is associated (e.g. semantic information), or a filter-specific action.

In such fashion, observing entities can use probabilistic filters to perform initial or complete beacon identifier processing or filtering and grouping locally and reduce unnecessary communication between the observing entity and the verifying entity. In addition, the use of probabilistic filters can greatly reduce filter storage requirements and, in instances in which the beacon identifiers are obscured, allow the observing entity to locally determine an appropriate action in response to an obscured identifier without requiring knowledge of the precise identity of the corresponding beacon device.

According to an aspect of the present disclosure, in some embodiments, a verifying entity can generate a probabilistic filter by, first, obtaining a set of beacon identifiers with respect to which the filter is desired to respond to membership queries. The beacon identifiers can respectively correspond to a plurality of beacon devices. According to an aspect of the present disclosure, in some embodiments, a verifying entity can generate a criteria-specific probabilistic filter by first identifying a plurality of beacon identifiers. The beacon identifiers can respectively correspond to a plurality of beacon devices that satisfy one or more criteria. The beacon identifiers can be static identifiers or can be ephemeral identifiers.

The selection of beacon identifiers as members of the set can be driven by numerous factors and/or design goals. For example, sets of beacon identifiers can be defined that correspond to particular use cases, geographic regions, applications, or other categorizations. Thus, the probabilistic filters can be used to determine membership of a received beacon identifier in any number of sets of beacon identifiers grouped together for different reasons.

The probabilistic filters can be Bloom filters, quotient filters, filters that employ Count-min sketch, MinHash filters, or other probabilistic filters or probabilistic data structures. In some embodiments, any probabilistic filter that provides the ability to perform approximate membership queries can be used.

The one or more criteria can be criteria that define certain times, geographic locations or areas, topics or categories (e.g. categories of retail items, locations, or restaurants), one or more particular users for whom the probabilistic filter is intended, or other criteria or combinations thereof. Thus, by selecting various criteria to be satisfied by the beacon devices used to generate the filter, the resulting probabilistic filter can allow criteria-specific filtering or grouping of later received messages or signals. As such, creating a plurality of filters according to different criteria can allow an observing entity to quickly and locally sort received messages into different groups that correspond to different use cases, geographic regions, applications, activities, organizations, or other categorizations.

As an example, the one or more criteria can be one or more geographic areas. Therefore, the resulting filter can be used to sort or group messages or signals received from beacon devices that are located in the one or more geographic areas.

As another example, the one or more criteria can be a relationship between the beacon device and a user associated with the observing entity. For example, beacon devices that have been previously interacted with by the user can be identified and used to create a filter. As another example, beacon devices that may be or are known to be of interest to the user can satisfy the criteria and be used to generate a user-specific filter. Thus, for example, a history of the user's location, previous interactions with various entities, or user preferences can be used to identify beacon devices that may be of interest to the user.

As yet another example, the one or more criteria can be membership of the beacon device to a particular application of a plurality of applications. For example, all beacon devices that are associated with an application that assists observing entities in discovering historical places can be identified and used to generate an application-specific filter usable for identifying messages that should be routed to the historical places application.

As another example, the one or more criteria can be a period of time. In particular, in some instances the beacon devices can emit ephemeral beacon identifiers that are valid representations of the beacon devices for only a given period of time. Thus, by selecting ephemeral identifiers that correspond to a certain period of time, the resulting filter can provide recognition of the corresponding beacon devices only for the certain period of time. For example, the period of time can include a continuous time-period or multiple non-consecutive time-periods.

According to an aspect of the present disclosure, in some embodiments, the verifying entity can identify the plurality of beacon identifiers in response to a search query received from the observing entity. The search query can specify the one or more criteria to be satisfied by the beacon devices. For example, the search query can have been formulated based on user input that identified the one or more criteria. As another example, the search query may be formulated by an application running on the observing entity and sent to the verifying entity.

In some embodiments, a database of beacon devices and their corresponding identifiers can be searchable according to various criteria. Thus, in response to the search query, the verifying entity can search the database to identify relevant beacon devices and then retrieve their corresponding beacon identifiers for use in generating the filter.

Alternatively, the desired beacon devices and/or their identifiers can be directly identified to the verifying entity by the observing entity. For example, the observing entity may periodically receive a beacon identifier from a beacon device. The observing entity can communicate with the verifying entity to learn the identity of the beacon device and can thereafter request from the verifying entity filter data (e.g. filter shards) that represents the identified beacon device. Using the filter data, the observing entity can subsequently recognize, filter, or group messages from the beacon device according to various groupings represented by various filters. Thus, in such embodiments, the one or more criteria satisfied by the beacon devices can be a requirement that they match a listing of devices or identifiers provided by the observing entity.

Having obtained the set of beacon identifiers to which the filter is desired to correspond, the verifying entity can determine a plurality of filter shards for each of the beacon identifiers in the set. According to another aspect of the present disclosure, in some embodiments, having obtained the plurality of beacon identifiers with respect to which the filter is desired to respond to membership queries, the verifying entity can determine a plurality of filter shards for each of the plurality of beacon identifiers. In particular, a plurality of hash functions can be applied to each beacon identifier to determine the plurality of filter shards for such beacon identifier.

As an example, in some embodiments, the plurality of hash functions can be a plurality of bit slicing functions that respectively select one or more bits from the beacon identifier being hashed. For example, the bit slicing functions can be used to generate the filter shards when the beacon identifier being hashed is already obscured (e.g. when the beacon identifiers are ephemeral identifiers).

In some embodiments, a plurality of access keys that are respectively assigned to a plurality of observing entities can be used to render the resulting filter shards specific to a particular observing entity. As an example, in some embodiments, prior to applying the plurality of hash functions to each beacon identifier, each beacon identifier can be obscured using an access key associated with the observing entity for which the filter is intended. The plurality of hash functions can then be applied to the obscured beacon identifiers to obtain the filter shards. In such fashion, if the access keys remain shared secrets between respective observing entities and the verifying entity, then a probabilistic filter that stores the resulting filter shards will be usable only by the observing entity that has knowledge of its specific access key.

In other embodiments, the hash functions themselves can utilize the access key to determine the plurality of filter shards for each beacon. For example, the hash functions can hash the beacon identifier using a plurality of variations of the access key (e.g. treat the access key as a hash seed). As another example, the hash functions can hash the beacon identifier using a plurality of different portions of the access key to obtain the filter shards.

Once filter shards have been generated for each beacon identifier in the set, all of the filter shards can be provided to an observing entity. The observing entity can receive the filter shards and store them locally in a probabilistic filter. Then, when the observing entity later receives a beacon identifier from a beacon device, the observing entity can query the probabilistic filter to receive an indication of whether the received beacon identifier is a member of the set of beacon identifiers that were used to generate the filter shards.

As another example, in some embodiments, only a subset of the filter shards that correspond to a given beacon device can be provided or used by the filter, based on a desired false positive error rate for the filter. In particular, there can be an proportional relationship between probabilistic filter size and false positive rates. As such, there may be economic or other resource limitations which require the filter to have a certain size or construction (e.g. limited to filter shards corresponding to only a certain number of beacon device identifiers or limited to a certain portion of all available filter shards for each included beacon device identifier).

In addition, filters can be built incrementally with generated filter shards. Therefore, filters can improve or otherwise change over time as new filter shards are added.

In some embodiments of the present disclosure, the observing device can receive or otherwise maintain a plurality of different probabilistic filters that were generated in the above discussed fashion based on differing sets of beacon identifiers. By using the probabilistic filters to determine which of such sets a received beacon identifier belongs to, the observing entity can identify an appropriate response without requiring communication with the verifying entity. In such fashion, probabilistic filters can be used to perform initial or complete beacon identifier processing locally and reduce unnecessary communication between the observing entity and the verifying entity.

According to another aspect of the present disclosure, the set of beacon identifiers used to generate the filter shards for a given filter can be a set of ephemeral identifiers. For example, each ephemeral identifier can be a time-varied obscuration of a static identifier associated with one of the plurality of beacon devices belonging to the set. As such, each ephemeral identifier can be a valid representative of the corresponding beacon device for a defined period of time.

Creating filter shards from ephemeral identifiers will allow the filter to provide time-specific membership responses. As an example, in some embodiments, ephemeral identifiers can be selected for inclusion in the set of identifiers used to generate the filter shards with the goal of having a certain beacon device be recognizable by a given filter (e.g. indicated as a member of the filter's correspond identifier set) for only a specific period of time. The specific period of time can be a continuous period of time or can include a plurality of non-consecutive time periods. In such fashion, the ability of an observing entity to recognize (e.g. determine set membership for) and respond to a beacon identifier from a particular beacon device can be controlled and/or limited to the specific period of time.

According to another aspect of the present disclosure, the current location, a predicted future location, or other criteria of the observing entity or its corresponding user can be used to select the beacon identifiers used to generate filter shards provided to the observing entity. According to another aspect of the present disclosure, the current location, a predicted future location, or other criteria of the observing entity or its corresponding user can be used to generate and/or provide the observing entity with location-specific probabilistic filters. In particular, in some embodiments of the present disclosure, the location of the observing entity can be tracked or periodically determined. As the observing entity moves about in the world, the verifying entity can identify corresponding beacon devices that are located approximate to the observing entity's location. New filter shards can be generated from the beacon identifiers associated with the beacon devices identified by the verifying entity. The new shards can be used to generate a new filter or can be used to supplement an existing filter on the observing entity. New shards corresponding to the identified beacon devices can be used to generate a new filter or can be used to supplement an existing filter on the observing entity. In such fashion, the filter data maintained by the observing entity can be updated to include the most relevant sets of beacon identifiers, as indicated by the observing entity's current location.

As another example, in some embodiments, the current location of the observing entity may be determined based on a location of a beacon device from which the observing entity has recently received a message. For example, the verifying entity can receive an indication from an observing entity that the observing entity recently received a beacon identifier from a particular beacon device. The location of the beacon device can then be used as the current location of the observing entity for the purpose of providing the observing entity with location-specific filters.

In some embodiments, the verifying entity generates filter shards for a given set of beacon identifiers at a single instance and then provides the generated filter shards to an observing entity in a bulk transfer. However, in other embodiments, filter shards that correspond to each potential beacon identifier can be pre-computed and stored in a filter shard database. Then, when a particular set of beacon identifiers is identified, the filter shards corresponding to each member of the set can be retrieved from the filter shard database and combined to provide a filter that corresponds to the newly identified set. The pre-computation and storage of filter shards can permit more efficient and responsive filter generation and, in some embodiments, can be used by verifying entities or observing entities to build filters on the fly.

Thus, filters can be composed incrementally based on external queries or in-bulk for circumstances where it is known in advance that the observing entity is likely to be exposed to a collection of beacon devices for which filters may be relevant. In particular, in some embodiments, observing entities may request filter shards that correspond to one or more beacon identifiers. For example, the request can specify the beacon identifiers, or can specify a topic, location, or other criteria and request that the verifying entity identify the corresponding beacon identifiers. The requested filter shards can then be used to generate a new filter or supplement an existing filter so that the observing entity is able to locally process the corresponding beacon identifiers in the future.

Thus, criteria-specific filters can be composed incrementally based on external queries or in-bulk for circumstances where it is known in advance that the observing entity is likely to be exposed to a collection of beacon devices for which criteria-specific filters may be relevant (e.g. upon determining that the observing entity is entering a shopping center or museum). Incremental construction of filters over time can allow filters to be built based on user interest and behavior and allows these filters to adapt to individual users.

As another example, in some embodiments, for each instance in which additional information concerning a particular beacon device is received by an observing entity from a verifying entity, the observing entity can store the received additional information in a local cache. In addition, filter shards representing the particular beacon device can be added to a probabilistic filter. When a beacon identifier is received, the observing entity can query the filter to determine whether information concerning the corresponding beacon device has been previously obtained and stored in the local cache. In such fashion, probabilistic filters can be used to identify when previously received information is stored locally, thereby reducing unnecessary or redundant communications to the verifying entity. In some embodiments, however, the observing entity may still communicate with the verifying entity to confirm the continuing validity of the locally stored information (e.g. when the storage date is older than some amount of time).

In some embodiments, the probabilistic filters can be periodically updated or eliminated and recomposed. For example, if the membership set of a given filter exceeds a threshold number of members, then the filter can become too prone to false positives and, therefore, can be subdivided or otherwise eliminated and recomposed in different formats or groupings. Filters can also be eliminated by observing entities if they become stale or no longer useful. For example, if no members of the filter are positively identified for some amount of time (e.g. no successful reference), then the filter can be eliminated.

According to another aspect of the present disclosure, as noted above, each observing entity can maintain a plurality of different filters. The observing entity can use the probabilistic filters to identify one or more sets of beacon identifiers to which the received beacon identifier belongs. As such, the observing entity can determine one or more appropriate actions to take in response to receiving the beacon identifier. In particular, the actions taken by the observing entity can depend upon the identified set membership of the received beacon identifier and can include, for example, routing the received beacon identifier to a particular application, disregarding the received beacon identifier, or communicating with the verifying entity to obtain additional information concerning the beacon device with which the received beacon identifier is associated.

In some embodiments, the probabilistic filters can respectively associate particular values with each member of the set to which the filter corresponds. Then, when the filter matches a query to a particular member, the particular value associated with the particular member can be returned. For example, these filters can be Bloomier filters.

As an example, the particular value associated with a given filter member can be used as a pointer to retrieve additional information (e.g. price, branding, or other information) that can be provided to the user. Thus, in some embodiments, the filter can be static while a local or external database that contains the additional information and is referenced by the particular values can be updated periodically.

As such, in instances in which the database of additional information is located at the observing entity, Bloomier filters (or other filters that return a particular value associated with a set member) can be used to obtain information concerning a beacon device absent a connection between the observing entity and the verifying entity. Furthermore, the use of Bloomier or similar filters can allow the observing entity to obtain the additional information without having to understand or de-obscure the ephemeral identifier.

The additional information can be specific to a particular beacon or can be information concerning a class of beacons. Thus, multiple particular values returned by the filter may map to a single data entry. Furthermore, the particular value may itself represent the additional information (e.g. price), with no redirection or further processing required.

In some embodiments, the plurality of probabilistic filters on an observing entity can be organized into a hierarchical configuration. This may allow for more efficient membership determinations according to various combinations of criteria. For example, filters can be combined (OR'd) to create more inclusive filters from more precise ones. As another example, filters can be stacked (AND'd) to create more exclusive filters from plural filters. Filters can also be cascaded to create progressively more selectivity.

Thus, probabilistic filters can be used to provide observing entities with the ability to perform some degree of beacon identifier processing locally, thereby reducing unnecessary communications between the observing entities and the verifying entity. Furthermore, the use of probabilistic filters can greatly reduce filter storage requirements and, in instances in which the beacon identifiers are obscured, allow the observing entity to locally determine an appropriate action in response to an obscured identifier without requiring knowledge of the precise identity of the corresponding beacon device.

Referring to the FIGS., example embodiments of the present disclosure will now be discussed in further detail, one or more examples of which are illustrated in the drawings. Each example is provided by way of explanation of the present disclosure, not limitation of the present disclosure.

In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example System

FIG. 1 depicts an example system 100 according to an example embodiment of the present disclosure. System 100 can include a plurality of beacon devices 102-110; one or more observing entities 112 and 114; and at least one verifying entity 118.

Beacon devices 102-110 can be used for many different applications, including, for example, co-presence (e.g. two entities becoming aware of each other), location-based gaming, asset tracking, beacon device localization, observing entity localization, telemetry, information provisioning (e.g. use of an observing entity to obtain various information such as semantic information or geographic information associated with beacon devices 102-110 as the observing entity moves about the world), luggage tags, intra-beacon communication, payment systems, etc. The present disclosure provides a general system that can be applicable to the above noted applications or other applications as well. More particularly, the present disclosure provides systems and methods that can generate and use probabilistic filters within the context of any of the above applications.

Beacon devices 102-110 can be computing devices that are configured to emit messages or other signals. For example, the messages can be advertising frames that include a beacon identifier that identifies the broadcasting beacon device. The beacon identifier can be a static identifier or an ephemeral identifier.

In some embodiments, the advertising frames can be used for the purpose of being "noticed" but not connected to. Thus, in such embodiments, the entirety of the interaction between the beacon devices 102-110 and the observing entities 112 and 114 can be performed without requiring a connection between the observing entity and the beacon device or a connection between the beacon device and the verifying entity. Instead, all relevant information for the interaction is contained within the advertising packets emitted by the beacon device. Limiting beacon device interaction to the broadcasting of advertising frames can provide a nominal behavior that allows energy consumption and service life to be modeled and reasonably predicted.

In other embodiments, however, the beacon devices 102-110 can allow connections for configuration, provisioning, maintenance, firmware updates, or other functions. For example, in some embodiments, the beacon devices 102-110 can connect with the verifying entity 118 over a second communication channel.

In yet further embodiments, the beacon devices 102-110 can be configured to provide additional information to an observing entity using a scan request (SCAN_REQ) and scan response (SCAN_RSP) interaction, which does not require actual connection between the devices.

As an example, the beacon devices 102-110 can broadcast the advertising frames using short range wireless communication technologies such as, for example, Bluetooth, Bluetooth low energy, ZigBee, Near Field Communication, WiFi Direct, or other technologies. Furthermore, although short range wireless communication technologies are provided as an example, any communication method can be used to transmit the advertising frames from the beacon devices 102-110 to the observing entities 112 and 114, including, for example, wired connections, general radio frequency communication, optical communication, infrared communication, magnetic communication, or other communication methods, including, for example, quantum communications.

Broadcasting of advertising frames can be the primary purpose of each beacon device 102-110 or can be a secondary purpose. Thus, in various embodiments of the present disclosure, each beacon device can be a computing device dedicated to periodic broadcasting of advertising frames; an embedded system within a larger computing device or system; a user computing device (e.g. a smartphone or wearable computing device) configured to perform broadcasting of advertising frames; other devices; or combinations thereof.

According to an aspect of the present disclosure, each of the beacon devices 102-110 can be provided with a beacon-specific static identifier at the time of provisioning. Example methods for assigning static identifiers will be discussed further below.

In instances in which the beacon devices 102-110 are desired to broadcast ephemeral identifiers, each beacon device 102-110 can also be provisioned with a beacon-specific secret key known as a rotation key. The static identifier and rotation key assigned to each beacon device 102-110 can also be known by the verifying entity 118 and can be used as a shared secret for ephemeral identifier generation and unobscuration.

In some embodiments, each advertising event performed by a beacon device can consist of up to three advertising (ADV) frames being emitted by the beacon device. In embodiments in which beacon devices employ Bluetooth low energy (BLE) technology for broadcasting, each ADV frame can carry a maximum 31-byte payload and can be sent on one of three designated advertising channels within the currently defined 40-channel BLE radio spectrum. However, the present disclosure can easily be adapted to various other advertising schemes. As noted, advertisements can be broadcast events that are capable of being received and processed by any listening device (e.g. observing entity). Further, the above example implementation using BLE technology is provided as an example only. Other suitable communication protocols having different frame formats or channel assignments can be used, as well. In addition, as certain protocols are modified or replaced over time, the present disclosure can be easily adapted for implementation using such new protocols.

In some embodiments, each ADV frame can indicate in the frame format whether the broadcasting beacon device is Connectable, Scannable, or Non-Connectable/Non-Scannable. For frames which are Connectable or Scannable, a listening device can send a request for an additional 31-byte frame to be sent which may contain additional information from the beacon device. The request (SCAN_REQ) can contain no data, only a "return address" to which the beacon device can direct its response (SCAN_RSP).

In some embodiments, each advertising frame can employ 26 of the maximum 31-byte payload. As an example, bytes 1-3 may be used for BLE flags; bytes 4-7 may be used for service data headers; byte 8 may be used to indicate a frame type; byte 9 may be used for flags and a radio channel on which the ADV frame is emitted; byte 10 may indicate a calibrated or estimated transmission power for the ADV frame; and bytes 11-26 may be used to communicate a beacon identifier such as the static beacon identifier or an ephemeral beacon identifier. In other embodiments, other frame formats or designations can be used.

As another example, each SCAN_RSP frame can include four bytes of manufacturer specific data header and 1-27 bytes of manufacturer specific payload data. For example, in some embodiments, the payload data of a SCAN_RSP frame can be used for telemetry or to provide other data.

In some embodiments, the static identifier assigned to each beacon device 102-110 can be a 16-byte time constant identifier. As an example, the static identifier can be the concatenation of a 10-byte namespace identifier and a 6-byte beacon instance identifier. However, other formats or bit-sizes can be used, as well.

As an example, the namespace identifier can be a class of beacons associated with a particular application or organization. Thus, in some embodiments, the namespace identifier can be used to select observed ADV frames for routing to a particular application that may be capable of further identifying the beacon instance identifier. Likewise, namespaces can provide a means for organization which deploy beacon devices to segment populations of beacon devices according to particular applications, use cases, or categorizations.

In some embodiments, each namespace identifier can be based on a Universally Unique Identifier (UUID). For example, the namespace identifier can be the four most significant bytes and the six least significant bytes of a 128-bit UUID determined according to Internet Engineering Task Force RFC: 4122.

The beacon instance identifier can identify a specific beacon device within a namespace. Each beacon instance identifier can be unique within a given namespace.

Observing entities 112 and 114 can be computing devices configured to receive advertising frames from each of beacon devices 102-110. As example, observing entities 112 and 114 can be user computing devices such as a smartphone, a laptop, a desktop, or a wearable computing device; and embedded system on a machine; other devices; or combinations thereof. In some embodiments, a single device may have components for performing beacon device functionality and components for performing observing entity functionality.

In some embodiments, each of observing entities 112 and 114 can have plural processors or processing modules. For example, each observing entity can include a system on a chip (SoC) that performs low-power background scans for advertising frames, provides a means for batching or filtering observed advertising frames, and performs periodic bulk-transfers to improve energy efficiency. Each of observing entities 112 and 114 can further include an application level processor with the capability to provide adaptive scanning collaboratively with the SoC. The application level processor can perform other high level tasks as well. Likewise, beacon devices 102-110 can also have plural processors or processing modules as discussed above.

Verifying entity 118 can be one or more computing devices configured to communicate with observing entities 112 and 114 over a network 116. As an example, verifying entity 118 can be one or more server computing devices. In the instance that a plurality of server computing devices are used, the server computing devices can be arranged according to any suitable computing architecture, including sequential computing architectures, parallel computing architectures, or combinations thereof.

Network 116 can be any type of communications network, such as a local area network (e.g., intranet), wide area network (e.g., Internet), or some combination thereof and can include any number of wired or wireless links. In general, communication between the verifying entity 118 and observing entities 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although each observing entity 112 and 114 is shown as communicating directly with the verifying entity 118 over network 116, there may be any number of intervening devices between the observing entity 112 or 114 and the verifying entity 118. As an example, in some embodiments, groups of observing entities can be organized in a network (e.g. a mesh network) and can relay messages back and forth from a particular observing entity to the verifying entity 118.

According to an aspect of the present disclosure, observing entities 112 and 114 can employ probabilistic filters to provide initial or complete processing of beacon identifiers received from beacon devices 102-110. According to an aspect of the present disclosure, observing entities 112 and 114 can employ criteria-specific probabilistic filters to sort or group beacon identifiers received from beacon devices 102-110 according to various criteria. In particular, the probabilistic filters can respectively include various filter shards to correspond to hashed versions of specific sets of beacon identifiers. The probabilistic filters can be queried to determine whether a received beacon identifier is a member of one or more of the specific sets of beacon identifiers. Based on the determined membership, the observing entities can sort the received message and determine one or more appropriate actions to further process the received beacon identifier.

Example Generation of Probabilistic Filters

Figure 2:
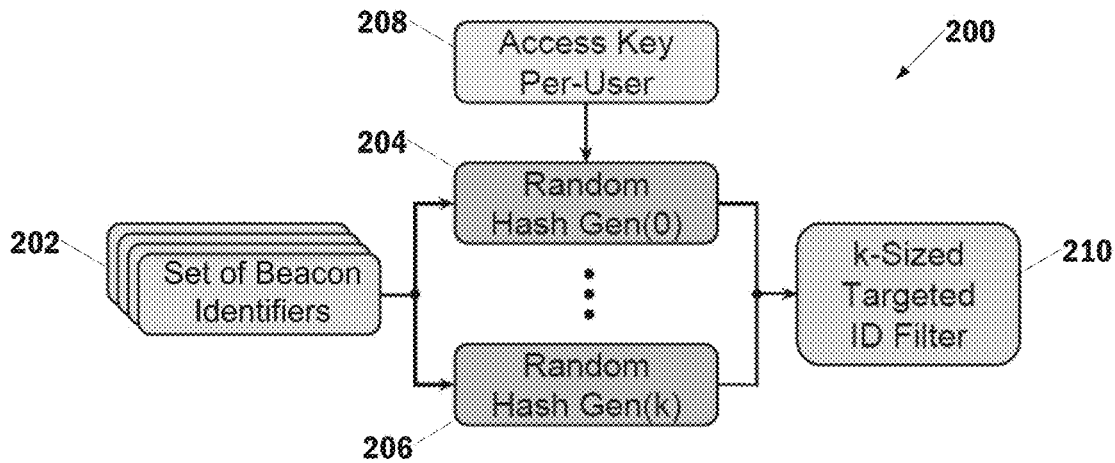
FIG. 2 depicts an example functional diagram for generating probabilistic filters on a verifying entity according to an example embodiment of the present disclosure.

FIG. 2 depicts an example functional diagram 200 for generating probabilistic filters on a verifying entity according to an example embodiment of the present disclosure. In particular, the verifying entity can obtain a set of beacon identifiers 202 with respect to which a resulting filter 210 is desired to respond to membership queries. The beacon identifiers in set 202 can respectively correspond to a plurality of beacon devices. The beacon identifiers in set 202 can be static identifiers or can be ephemeral identifiers. The probabilistic filter 210 can be a Bloom filter, a quotient filter, or other probabilistic filters or probabilistic data structures.

The selection of beacon identifiers as members of the set 202 can be driven by numerous factors and/or design goals. For example, sets of beacon identifiers can be defined that correspond to particular use cases, geographic regions, applications, or other categorizations, as will be discussed further with respect to FIG. 3. As another example, beacon identifiers can be included in the set 202 in response to a search query (e.g. identified by the verifying entity in response to a search query from an observing entity) or can be included in the set 202 in response to a request for a filter from an observing entity, wherein the request specifies the beacon identifiers or their corresponding beacon devices. Thus, the probabilistic filters can be used to determine membership of a received beacon identifier in any number of sets of beacon identifiers grouped together for different reasons.

The probabilistic filters can be Bloom filters, quotient filters, filters that employ Count-min sketch, MinHash filters, or other probabilistic filters or probabilistic data structures. In some embodiments, any probabilistic filter that provides the ability to perform approximate membership queries can be used.

Having obtained the set of beacon identifiers 202 to which the filter 210 is desired to correspond, the verifying entity can determine a plurality of filter shards for each of the beacon identifiers in the set 202. In particular, a plurality of hash functions (e.g. 204 and 206) can be applied to each beacon identifier in set 202 to determine the plurality of filter shards for such beacon identifier.

As an example, in some embodiments, the plurality of hash functions 204 and 206 can be a plurality of bit slicing functions that respectively select one or more bits from the beacon identifier being hashed. For example, the bit slicing functions can be used to generate the filter shards when the beacon identifier being hashed is already obscured (e.g. when the beacon identifiers are ephemeral identifiers).

In some embodiments, a plurality of access keys (e.g. access key 208) that are respectively assigned to a plurality of observing entities can be used to render the resulting filter shards specific to a particular observing entity. As an example, in some embodiments, prior to applying the plurality of hash functions 204 and 206 to each beacon identifier, each beacon identifier can be obscured using an access key 208 associated with the observing entity for which the filter 210 is intended. The plurality of hash functions 204 and 206 can then be applied to the obscured beacon identifiers to obtain the filter shards. In such fashion, if the access keys remain shared secrets between respective observing entities and the verifying entity, then a probabilistic filter that stores the resulting filter shards will be usable only by the observing entity that has knowledge of its specific access key.

In other embodiments, the hash functions 204 and 206 can utilize the access key 208 to determine the plurality of filter shards for each beacon identifier. For example, the hash functions 204 and 206 can hash the beacon identifier using a plurality of variations of the access key 208 (e.g. treat the access key as a hash seed). As another example, the hash functions can hash the beacon identifier using a plurality of different portions of the access key 208 to obtain the filter shards.

The generated filter shards can then be stored within the filter 210. For example, the filter shards can correspond to certain values that were output by the hash functions. In some embodiments, storing the filter shards within the filter 210 can be performed by setting equal to one each position in a bit array that corresponds to one of the filter shard values, while positions in the bit array that do not correspond to any of the filter shard values can be set equal to or remain equal to zero.

In other embodiments, filter shards that correspond to each potential beacon identifier can be pre-computed and stored in a filter shard database. This allows for calculation of many more shards than would be expected to be used by a single filter. Then, when a particular set of beacon identifiers is identified, the filter shards corresponding to each member of the set can be retrieved from the filter shard database and combined to provide a filter that corresponds to the newly identified set. The pre-computation and storage of filter shards can permit more efficient and responsive filter generation and, in some embodiments, can be used by verifying entities or observing entities to build filters on the fly.

Figure 3:
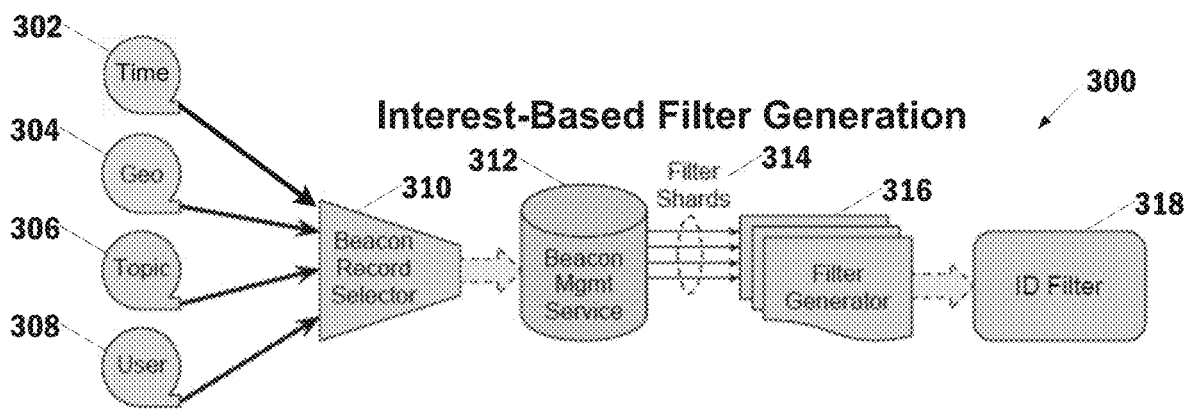
FIG. 3 depicts an example functional diagram for interest-based or criteria-specific probabilistic filter generation according to an example embodiment of the present disclosure.

FIG. 3 depicts an example functional diagram 300 for interest-based or criteria-specific probabilistic filter generation according to an example embodiment of the present disclosure.

Generally, the criteria for selecting which beacon identifiers to include in a particular filter can be determined by the entity constructing the filter. In some embodiments, criteria such as time 302, geo-location 304, topic 306 (e.g. retail item, historical site, thermostat), and/or information concerning a particular user 308 (e.g. the user enjoys fishing) can be used in any combination to select particular beacon identifiers to include.

In some embodiments, the particular beacon identifiers to include in the filter can be identified in response to a search query received from the observing entity. The search query can specify the one or more criteria 302-308 (or other criteria) to be satisfied by the beacon devices. For example, the search query can have been formulated based on user input that identified the one or more criteria 302-308. As another example, the search query may be formulated by an application running on the observing entity and sent to the verifying entity.

In some embodiments, one or more of the criteria 302-308 can be used to query (shown at 310) a beacon management service 312 to identify all beacon identifiers that match the searched criteria. The relevant beacon identifiers can then be added to a set of beacon identifiers for which the filter 318 is created. Alternatively, the filter shards for each beacon identifier can be pre-computed and accessible by the beacon management service 312. In such instances, when a set of beacon identifiers is returned as search results, the corresponding pre-computed filter shards 314 can be obtained and provided to a filter generator 316 for generating the probabilistic filter 318.

As an example use of the present disclosure, a user shopping for sporting goods in a certain shopping center can input the category of sporting goods as a topic 306, the shopping center as a location 304, and a shopping time 302 as criteria and can receive a personalized filter 318 that includes only beacon identifiers used by beacon devices that correspond to sporting goods items within the shopping center.

Furthermore, in the instance in which time-varying ephemeral identifiers are used, the filter 318 can be limited to corresponding to ephemeral identifiers that satisfy the search criteria and that are valid (e.g. expected to be used by the beacon devices) only for the period of time in which the user is present at the shopping center.

In addition, in the instance in which ephemeral identifiers are used to construct the personalized filter 318, the filter can recognize only ephemeral identifiers that will be used by the beacon devices in a given period of time, such as, for example, the shopping time 302 provided as a criterion by the user. One benefit of such approach is that the amount of data required to transmit and store the filter can be reduced.

Alternatively, the desired beacon devices and/or their identifiers can be directly identified to the verifying entity by the observing entity. For example, the observing entity may periodically receive a beacon identifier from a beacon device. The observing entity can communicate with the verifying entity to learn the identity of the beacon device and can thereafter request from the verifying entity filter data (e.g. filter shards 314) that represents the identified beacon device.

In some embodiments, the filter generator 316 can operate by setting equal to one each position in a bit array that corresponds to one of the filter shards 314, while positions in the bit array that do not correspond to any of the filter shards 314 can be set equal to or remain equal to zero.

In some embodiments, the probabilistic filters can associate a particular value associated with each member of the set to which the filter corresponds. Then, when the filter matches a query to a set of filter elements that correspond to a particular member, the particular value associated with the particular member can be returned. For example, these filters can be Bloomier filters.

The filter 318 can be cached at the verifying entity or other cloud storage location for use when appropriate, or can be sent to the observing entity immediately for use and stored locally at the observing entity.

Furthermore, in some embodiments, the filter shards 314 may be sent to the observing entity and the observing entity can perform the filter generation (e.g. instead of filter generator 316) by generating a new filter 318 or supplementing an existing filter.

Thus, filters can be composed incrementally based on external queries or in-bulk for circumstances where it is known in advance that the observing entity is likely to be exposed to a collection of beacon devices for which filters may be relevant (e.g. upon determining that the observing entity is entering a shopping center or museum). Incremental construction of filters over time can allow filters to be built based on user interest and behavior and allows these filters to adapt to individual users.

Furthermore, filters can be constructed ad-hoc based on current user location data or other location information. For example, locality of a particular beacon device with which an observing entity has interacted can trigger the proactive download of filter shards for other nearby, relevant, or related filter shards and allow for ad-hoc filter construction on the observing entity.

In some embodiments, the observing entities can construct filters to keep track of specific places of interest or visits to particular locations. These locally constructed filters can be used to refine or improve the focus of a generic filter already present on the observing entity. For example, if a user visits a museum, they can receive from a verifying entity a generic filter for the museum that includes data corresponding to the most commonly viewed exhibits. However, if the user visits certain less popular exhibits, the user may collect additional information (e.g. additional filter shards) that can be used to augment the generic filter.

Further, an analysis of a larger collection of ad-hoc filters generated by different observing entities can reveal various aspects or information that can be used to provide improved generic filters. For example, locally created filters can be uploaded to the verifying entity for analysis. If the analysis reveals that a certain exhibit that was believed to be a less popular exhibit has, in fact, been used to augment many of the observing entities' generic filters, then the generic filter can be modified so that it includes the certain exhibit for future users. Thus, performing crowd-sourcing or having users "vote with their feet" can improve location-associated filters so that they more directly correspond to expected location patterns and beacon device interactions.

These more focused filters can periodically replace larger bulk-filters as a form of "garbage collection" to reduce required storage and improve lookup time, thereby also reducing processing energy required for filter usage.

Filters can also be composed in a manner where it is possible to use recency or volume of reference to control the size of a locally retained cache. Alternatively, filters can be recomposed and updated in-bulk on a periodic basis based on logs of like references stored at the verifying entity.

Example Processing of Beacon Identifier

Figure 4:
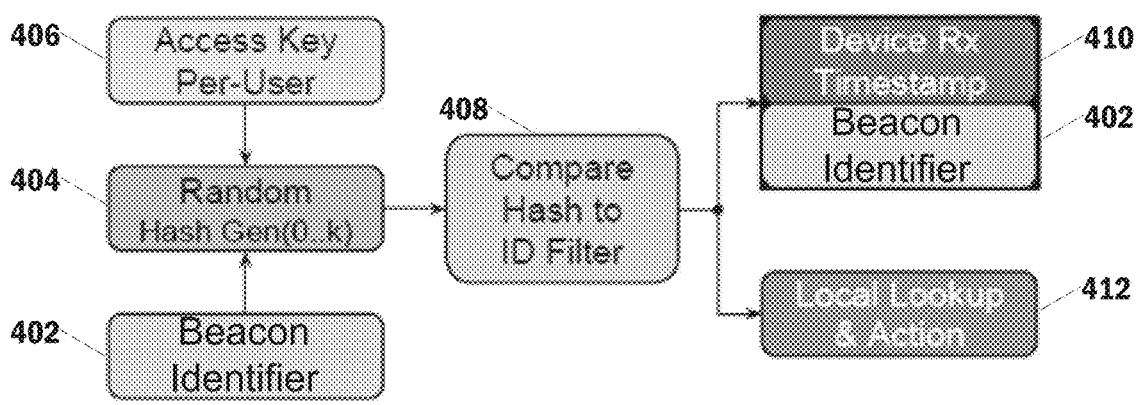
FIG. 4 depicts an example functional diagram for processing beacon identifiers on an observing entity according to an example embodiment of the present disclosure.

FIG. 4 depicts an example functional diagram for processing beacon identifiers on an observing entity according to an example embodiment of the present disclosure. In particular, the observing entity can receive a beacon identifier 402 from a beacon device.

The observing entity can apply a plurality of hash functions 404 to the beacon identifier 402 to obtain a plurality of hashed identifiers. The plurality of hashed identifiers can then be used to query (shown at 408) a probabilistic filter to receive an indication of whether the beacon identifier 402 is a member of a set of beacon identifiers represented by the probabilistic filter. More particularly, the probabilistic filter can contain filter shards generated by a verifying entity based on the set of beacon identifiers. In some embodiments, filter shards received by an observing entity from another observing entity can be used to generate a new filter or supplement an existing filter.

In some embodiments of the present disclosure, a plurality of access keys that are respectively assigned to a plurality of observing entities can be used to make probabilistic filters that are specific to a particular observing entity. As an example, in such embodiments, prior to applying the plurality of hash functions 404 to beacon identifier 402, the observing entity can obscure the beacon identifier 402 using an access key 406 associated with the observing entity. The plurality of hash functions 404 can then be applied to the obscured beacon identifier to obtain the hashed identifiers.

As another example, the hash functions 404 can utilize the access key 406 to determine the hashed identifiers for the beacon identifier 402. For example, the hash functions 404 can hash the beacon identifier 402 using a plurality of variations of the access key 406 (e.g. treat the access key 406 as a hash seed). As another example, the hash functions 404 can hash the beacon identifier using a plurality of different portions of the access key 406 to obtain the filter shards.

According to an aspect of the present disclosure, the observing entity can use the indication of the membership of the beacon identifier 402 in the set of beacon identifiers used to generate the probabilistic filter to determine an appropriate response to receiving the beacon identifier. For example, the observing entity can transmit the beacon identifier 402 and a device reception timestamp 410 to the verifying entity. The device reception timestamp 410 can indicate a time at which the observing entity received the beacon identifier 402 from the beacon device. Alternatively or in addition to the device reception timestamp, the observing entity can also communicate its current location, an indication of any recently observed beacon devices, and/or other information that can be used by the verifying entity to assist in performing desired functionality.

As another example, the observing entity can perform a local lookup and action 412 in response to the indication of the membership of the beacon identifier 402 in the set of beacon identifiers used to generate the probabilistic filter. For example, the local action 412 may be routing the beacon identifier 402 to a particular application associated with the probabilistic filter that the beacon identifier 402 satisfied.

Other actions can be taken as well, including, for example, disregarding the beacon identifier 402 if the beacon identifier 402 is not a member of any identifier set represented by any filter contained on the observing entity.

In addition, although the beacon identifier 402 is shown in FIG. 4 as being compared to a single filter, in some embodiments of the present disclosure, the observing device can receive or otherwise maintain a plurality of different probabilistic filters that were generated based on differing sets of beacon identifiers.

As an example, in some embodiments, the plurality of probabilistic filters on an observing entity can be organized into a hierarchical configuration. This may allow for more efficient membership determinations. For example, filters can be combined (OR'd) to create more inclusive filters from more precise ones. As another example, filters can be stacked (AND'd) to create more exclusive filters from plural filters. Filters can also be cascaded to create progressively more selectivity.

Thus, probabilistic filters can be used to provide observing entities with the ability to perform some degree of beacon identifier processing locally, thereby reducing unnecessary communications between the observing entities and the verifying entity. Furthermore, the use of probabilistic filters can greatly reduce filter storage requirements and, in instances in which the beacon identifiers are obscured, allow the observing entity to locally determine an appropriate action in response to an obscured identifier without requiring knowledge of the precise identity of the corresponding beacon device.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Furthermore, as used herein, the term "computing device" refers to an electronic device for storing and processing data. Each computing device can include one or more processors and a memory. The memory can store instructions that, when implemented by the one or more processors, cause the one or more processors to perform operations to provide functionality. In addition, in some instances computing devices can implement one or more modules to provide certain functionality. The term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. One or more non-transitory computer-readable media storing instructions that, when executed by one or more processors, cause the one or more processors to perform operations, the operations comprising:
   obtaining a plurality of beacon identifiers respectively associated with a plurality of beacon devices, wherein obtaining the plurality of beacon identifiers comprises obtaining a search query from an observing entity and obtaining the plurality of beacon identifiers respectively associated with the plurality of beacon devices in response to the search query;
   determining a plurality of filter shards for each beacon identifier by applying a plurality of hash functions to each beacon identifier; and
   providing the plurality of filter shards for each beacon identifier for local storage in a probabilistic filter at the observing entity, such that the observing entity can query the probabilistic filter to receive an indication of whether a received identifier is a member of a set that includes the plurality of beacon identifiers.

2. The one or more non-transitory computer-readable media of claim 1, wherein the search query specifies one or more criteria to be satisfied by the plurality of beacon devices.

3. The one or more non-transitory computer-readable media of claim 1, wherein the search query is formulated based on user input.

4. The one or more non-transitory computer-readable media of claim 1, wherein the search query is formulated by an application on the observing entity.

5. The one or more non-transitory computer-readable media of claim 1, wherein obtaining the plurality of beacon identifiers comprises:
   obtaining a request from the observing entity; and
   obtaining the plurality of beacon identifiers respectively associated with the plurality of beacon devices in response to the request.

6. The one or more non-transitory computer-readable media of claim 1, wherein the request specifies at least one of the plurality of beacon identifiers or the plurality of beacon devices.

7. The one or more non-transitory computer-readable media of claim 1, wherein each beacon identifier is obscured with an access key to obtain a respective obscured identifier, and wherein the plurality of hash functions are applied to each of the respective obscured identifiers to obtain the plurality of filter shards.

8. The one or more non-transitory computer-readable media of claim 1, wherein the observing entity is configured to perform one or more operations based at least in part on the indication of whether the received identifier is the member of the set that includes the plurality of beacon identifiers.

9. A computer-implemented method for generating probabilistic filters, the method comprising:
   obtaining, by one or more computing devices, a plurality of beacon identifiers respectively associated with a plurality of beacon devices, wherein obtaining the plurality of beacon identifiers comprises obtaining a search query from an observing entity and obtaining the plurality of beacon identifiers respectively associated with the plurality of beacon devices in response to the search query;
   determining, by one or more computing devices, a plurality of filter shards for each beacon identifier by applying a plurality of hash functions to each beacon identifier; and
   providing, by one or more computing devices, the plurality of filter shards for each beacon identifier for local storage in a probabilistic filter at the observing entity, such that the observing entity can query the probabilistic filter to receive an indication of whether a received identifier is a member of a set that includes the plurality of beacon identifiers.

10. The computer-implemented method of claim 9, wherein obtaining, by the one or more computing devices, the plurality of beacon identifiers respectively associated with the plurality of beacon devices comprises:
    obtaining the plurality of beacon identifiers respectively associated with the plurality of beacon devices based at least in part on one or more criteria.

11. The computer-implemented method of claim 10, wherein:
    the one or more criteria comprise a period of time;
    the plurality of beacon identifiers comprise a plurality of ephemeral identifiers; and
    each ephemeral identifier is a valid representation of a corresponding beacon device for only a given period of time, such that the corresponding beacon device will be recognizable to the probabilistic filter only for the period of time.

12. The computer-implemented method of claim 10, wherein:
    the one or more criteria comprise one or more geographic areas; and
    the plurality of beacon devices comprise beacon devices located within the one or more geographic areas.

13. The computer-implemented method of claim 10, wherein the one or more criteria comprise a topic or category.

14. The computer-implemented method of claim 10, wherein the one or more criteria comprise a relationship between the plurality of beacon devices and a particular application of a plurality of applications.

15. The computer-implemented method of claim 10, wherein the one or more criteria comprises a relationship between the plurality of beacon devices and a user associated with the observing device.

16. A computing system comprising:
    one or more processors; and
    one or more non-transitory computer-readable media storing instructions that, when executed by one or more processors, cause the one or more processors to perform operations, the operations comprising:
    obtaining a plurality of beacon identifiers respectively associated with a plurality of beacon devices, wherein obtaining the plurality of beacon identifiers comprises obtaining a search query from an observing entity and obtaining the plurality of beacon identifiers respectively associated with the plurality of beacon devices in response to the search query;
    determining a plurality of filter shards for each beacon identifier by applying a plurality of hash functions to each beacon identifier; and
    providing the plurality of filter shards for each beacon identifier for local storage in a probabilistic filter at the observing entity, such that the observing entity can query the probabilistic filter to receive an indication of whether a received identifier is a member of a set that includes the plurality of beacon identifiers.

17. The computing system of claim 16, wherein obtaining the plurality of beacon identifiers respectively associated with the plurality of beacon devices comprises:
    obtaining the plurality of beacon identifiers respectively associated with the plurality of beacon devices based at least in part on a current location of the observing entity.

18. The computing system of claim 16, wherein the operations further comprise:
    obtaining data indicative of one or more locally created probabilistic filters associated with one or more other observing entities; and
    obtaining the plurality of beacon identifiers respectively associated with the plurality of beacon devices based at least in part on the one or more locally created probabilistic filters.

19. The computing system of claim 16, wherein the operations further comprise:
    providing the plurality of filter shards for storage in a filter shard database.

* * * * *